June 19, 1928.  1,674,235
H. BATEMAN
HIGH PRESSURE VALVE
Filed March 12, 1926
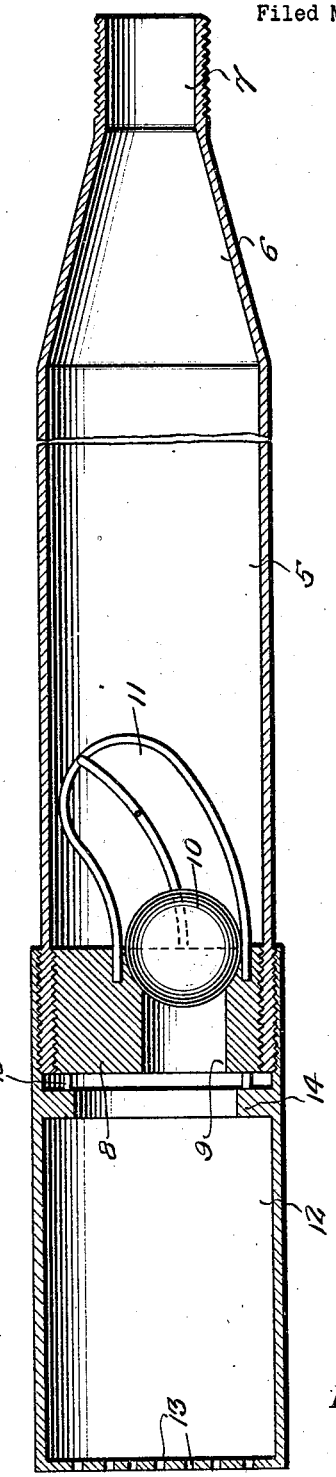
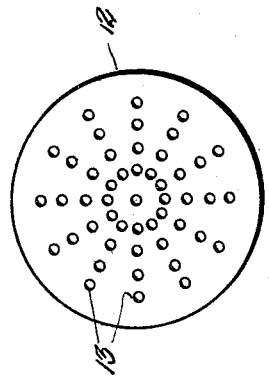
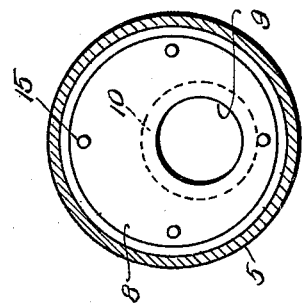
Inventor
Harry Bateman,
By Clarence A O'Brien
Attorney Patented June 19, 1928.

1,674,235

UNITED STATES PATENT OFFICE.

HARRY BATEMAN, OF BRISBIN, PENNSYLVANIA, ASSIGNOR OF ONE-HALF TO WILLIAM M. BURNS, OF HOUTZDALE, PENNSYLVANIA.

HIGH-PRESSURE VALVE.

Application filed March 12, 1926. Serial No. 94,235.

This invention relates to high pressure valves for suction lines installed in mines and the like for pumping the water therefrom, and has for its primary object to provide a valve that will automatically close should the suction be cut off, for preventing the water from pushing back through the line and flowing into the mine.

A further object is to provide a valve of this character that comprises but few parts and these so co-related as to permit the valve to be readily disassembled for cleaning, repair, or renewal purposes.

Other objects will become apparent as the nature of the invention will be better understood, the same comprising the novel form, combination and arrangement of parts hereinafter more fully described and shown in the accompanying drawing and claimed.

In the drawings wherein like reference characters indicate corresponding parts throughout the several views:—

Figure 1 is a detail longitudinal section through a valve constructed in accordance with the present invention, Fig. 2 is an end elevation thereof, and Fig. 3 is an end elevation of the valve after the strainer section has been detached therefrom.

Now having particular reference to the drawing, my novel high pressure valve constitutes the provision of a barrel 5 of tubular formation, one end thereof being interiorly and exteriorly threaded as disclosed in Fig. 1, the opposite end thereof being tapered as at 6 provided with an exteriorly threaded extension 7 to facilitate the attachment of the valve to the suction line.

Threaded within the lower end of the barrel 5 is an annular block of metal or other suitable material 8 formed with an eccentric opening 9, the inner end of which is constructed to provide a seat for a ball valve 10.

Anchored to the annular block 8 at the inner side thereof is a cage 11 for the ball valve 10, said cage being constructed from a pair of wire strips bent into general U-formation and that are arranged at right angles to each other as clearly disclosed in Fig. 1. Also the strips of wire forming the cage are so bent as to project toward the side of the barrel 5 opposite from the side adjacent the eccentric opening 9 in the block 8 in order that when the ball valve 10 is raised from its seat and moved upwardly within the end of the cage by the action of the water passing therethrough, said ball valve will be directly out of the path of force of the water and will not interrupt the flow thereof.

Threaded upon the lower end of the barrel 5 is a strainer 12 of tubular piping closed at its lower end and being provided at said closed end with perforations 13 for permitting the entrance of the fluid, but preventing dirt, stone and the like from passing into the valve. The strainer 12 is formed adjacent its upper end with an internal annular shoulder 14 for reinforcement purposes and for also supporting the valve block 8 which is formed on its under side with projecting pins 15 that rest upon the shoulder as clearly shown in Fig. 1.

The detail features of construction as well as the operation of the invention is readily understood from the foregoing specification when considered in conjunction with the accompanying drawings. Even though I have herein shown and described the valve consisting of certain specific elements, it is nevertheless to be understood that modifications may be had therein without affecting the spirit and scope of the appended claims.

Having thus described my invention, what I claim as new and desire to secure by Letters Patent is:—

1. In a valve of the class described, a barrel adapted to be attached at one end to a suction line, a circular block secured in the other end of the barrel, said block being provided with an eccentric fluid passage, the inner end of the passage being shaped to provide a valve seat, an immovable wire cage secured to the inner face of the circular block around the passage and being curved in a direction remote from the eccentric opening, a ball valve arranged within the cage and adapted to normally rest upon the valve seat by gravity, said cage being so constructed as to cause the ball valve to move toward the side of the barrel out of alignment with the fluid passage when raised by the fluid passing therethrough, by suction.

2. In a valve unit, a block provided with an eccentric fluid passage, one end of the passage being tapered to provide a valve seat, an immovable cage formed of a pair of right angularly disposed U-shaped wire members, the free ends of the arms of said U-shaped members being anchored in one end of a block for disposition around the valve seat, the arms of the U-shaped wire members being curved in a direction remote from the eccentric fluid passage formed in the block, and a ball valve arranged within the cage and adapted to normally rest upon the valve seat by gravity, the cage being so constructed as to cause the ball valve to move toward the curved outer end of the cage out of alignment with the fluid passage when raised by fluid passing through said passage.

In testimony whereof I affix my signature.

HARRY BATEMAN.